June 2, 1925.
E. SCHRÖDER
1,540,572
METHOD OF MANUFACTURING SHEET METAL VESSELS
Filed Dec. 6, 1924

*Fig. 3.* 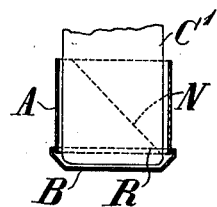  *Fig. 4.* 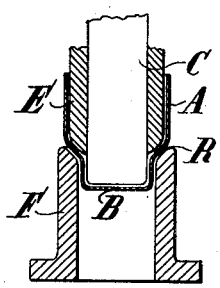  *Fig. 4a.* 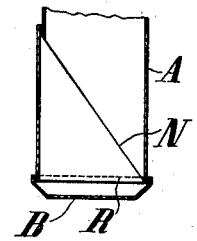
*Fig. 5.* 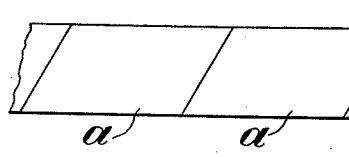  *Fig. 6.* *Fig. 7.* 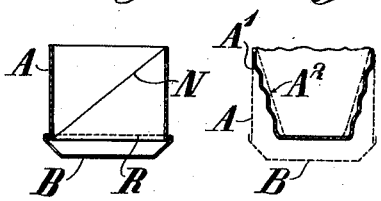
*Fig. 8.* 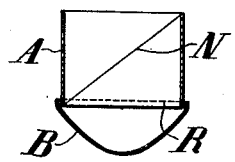  *Fig. 9.* 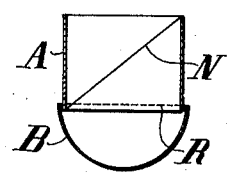
INVENTOR.
Edmund Schröder
By William C. Sinton
Atty.

Patented June 2, 1925.

1,540,572

UNITED STATES PATENT OFFICE.

EDMUND SCHRÖDER, OF BERLIN, GERMANY.

METHOD OF MANUFACTURING SHEET-METAL VESSELS.

Application filed December 6, 1924. Serial No. 754,389.

*To all whom it may concern:*

Be it known that I, EDMUND SCHRÖDER, a citizen of the German Republic, and resident at Nos. 48–51, Maybach-Ufer, Berlin, Germany, have invented a new and useful Improvement in Methods of Manufacturing Sheet-Metal Vessels, of which the following is a specification.

My invention relates to the manufacture of vessels of sheet-metal; more especially, it relates to the manufacture of vessels of sheet-iron which permits to close the seams electrically by welding, i. e., either by electric resistance-welding or by electric fusing-welding.

With both these known welding processes the smoothing of the seams entails much subsequent or extra work, especially if the seam shall become as invisible as possible. That smoothing has been effected hitherto either by means of mechanically operated hammers or by mechanically driven rollers, viz, by heavy head-rolling or flanging machines in the case of circular seams, or by fold-pressing or fold-compressing machines in the case of longitudinal seams.

In order to facilitate understanding my improved method, I think it proper to state briefly the method now in use, but before entering thereinto I refer to the accompanying drawing, in which Figures 1 and 2 relates to the old method and Figures 3–9 to the new one.

Fig. 3 is an illustration similar to Fig. 1, but pertaining to the improved method, Fig. 4 shows the same vessel-parts in another stage of the working procedure, together with certain tools used in this procedure;

Fig. 4ª is a view similar to Fig. 3, showing a modification;

Fig. 5 shows a strip of sheet-iron subdivided by oblique cuts; and

Figs. 6, 7, 8, and 9 are also views similar to Fig. 3 and show other modifications, which are all fully described hereinafter.

Figure 1:
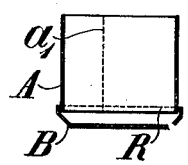
Fig. 1 is an axial section through an unfinished vessel consisting of a body or side-wall and of a bottom.
Figure 2:
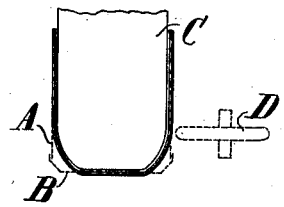
Fig. 2 shows the body or side-wall and the bottom united with one another, in connection with two working-members, of which one is shown in dotted lines.

Referring first to Figs. 1 and 2, as already stated in the preamble, the vessel-parts consist of a cylindrical body or side-wall A (Fig. 1) and of a basin-shaped bottom B. R denotes the two rims which are to be united with one another by welding, and $a'$ denotes the straight vertical seam of the side-wall or body. Supposing, the rims R have been welded together, the low and narrow collar thereby formed is smoothed by means of a pressure-roll with the aid of a mandrel C. Certain considerations require the use of a pressure roll which is spherical in axial direction, and this being so the outer circumferential surface of the roll tends to slide off the collar formed by the welded rims R (Fig. 1).

It is obvious that smoothing the longitudinal seam $a'$ and the circumferential seam R necessitate two operations. In my improved method the two operations are united with one another in such a manner that they are being carried through in one phase. This will become clear from Fig. 3 which shows an oblique or spherical seam N instead of the straight seam $a'$ (Fig. 1). This seam and the seam R can be smoothed in one phase if the diameter of the body or side-wall and of the bottom is chosen a little larger so that a drawing procedure can be carried through, as indicated in Fig. 4, in which C, E and F are the tools with the aid of which the drawing-phase is carried through. First the circumferential seam R is smoothed and instantly thereafter the oblique or spiral seam N, without interruption of the movement of the mandrel or plunger C.

The sheet-metal intended to form the body or side-wall of the vessel is preferably so cut that the rims intended to form the oblique or spirally shaped seam (at N) overlap one another, as shown in Fig. 4ª. This is suited especially in the case of electric resistance welding.

The cylindrical sheet-metal parts intended to form the side-walls or bodies of the vessels may be cut from a continuous strip of metal in the manner shown in Fig. 5, in which the strip is subdivided into parallelogrammatic pieces $a$, $a$ by oblique cuts, as shown, the oblique edges or rims forming later on, when having been welded together, the oblique or spirally-shaped seam N (Fig. 6).

The new method is not restricted to the manufacture of strictly cylindrical vessels; also conical ones, etc., may be made in the manner described. This is effected by drawing the united body and bottom in steps, as shown in Fig 7, in which the full lines show the shape of the vessel after the drawing in steps has taken place. This stepped vessel is then turned into the conical shape indicated by the dotted line $A^2$ which may be effected by any suitable of the known machine-tools employed for the deformation of sheet-metal plates.

It is obvious that the bottom B may have any other shape than that shown in Figs. 1, 3, 4 and 6. It may, for instance, be shaped as in Figs. 8 and 9, or any other desired or required shape may be used.

I claim:

1. The method of manufacturing vessels of sheet-iron, consisting in manufacturing a vessel body by bending suitably a suitable piece of sheet-iron and closing the joint by welding, manufacturing separately a sheet-metal bottom and welding it to said body, and smoothing the two welding seams in a continuous working phase by drawing, substantially as set forth.

2. The method of manufacturing vessels of sheet-iron, consisting in manufacturing a vessel body, the diameter of which is larger than that of the vessel to be made, by bending suitably a suitable piece of sheet-iron and closing the joint by welding; manufacturing separately a sheet-metal bottom, the diameter of which corresponds practically to that of said body, and welding it thereto, and smoothing the two welding seams in a continuous working phase by drawing, and diminishing at the same time, also by said drawing, the diameter of the so far finished vessel to its ultimate length, substantially as set forth.

3. The method of manufacturing vessels of sheet-iron, consisting in manufacturing a vessel body by bending suitably a parallelogrammatic piece of sheet-iron and closing the oblique joint by welding, manufacturing separately a sheet-metal bottom and welding it to said body, and smoothing the two welding seams in a continuous working phase by drawing, substantially as set forth.

4. The method of manufacturing vessels of sheet-iron, consisting in manufacturing a vessel-body, the diameter of which is larger than that of the vessel to be made, by bending suitably a parallelogrammatic piece of sheet-iron and closing the spirally-shaped joint by welding, manufacturing separately a sheet-metal bottom, the diameter of which corresponds practically to that of said body, and welding it thereto, and smoothing the two welding seams in a continuous working phase by drawing, and diminishing at the same time, also by said drawing, the diameter of the so far finished vessel to its ultimate length, substantially as set forth.

In witness whereof I have hereunto set my hand.

EDMUND SCHRÖDER.